(12) United States Patent
Deierling (10) Patent No.: US 6,239,847 B1
(45) Date of Patent: May 29, 2001

(54) TWO PASS MULTI-DIMENSIONAL DATA SCALING ARRANGEMENT AND METHOD THEREOF

(75) Inventor: Kevin Deierling, Los Altos Hills, CA (US)

(73) Assignee: Netergy Networks, Inc., Santa Clara, CA (US)

( * ) Notice: Subject to any disclaimer, the term of this patent is extended or adjusted under 35 U.S.C. 154(b) by 0 days.

(21) Appl. No.: 08/990,287

(22) Filed: Dec. 15, 1997

(51) Int. Cl.[7] .................................. H04N 9/74; H04N 5/21

(52) U.S. Cl. ............................................. 348/581; 348/607

(58) Field of Search ................................... 348/581, 580, 348/579, 583, 607; 382/298; H04N 9/74, 5/21

(56) References Cited

U.S. PATENT DOCUMENTS 5,982,459 * 11/1999 Fandrianto ........................ 348/845.2

OTHER PUBLICATIONS

"Alladin's Digital Processing," Pinnacle Systems, http://www.pinnaclesys.com/pinnacle/faxhtml/TFAX106.htm., pp. 1–3.

* cited by examiner

Primary Examiner—Sherrie Hsia (57) ABSTRACT

A video data scaling arrangement as implemented with both vertical and horizontal scaling provided using the same programmable filter. The scaling is provided as rows of video data are received from a video source. According to one example embodiment using an incoming video data stream, video data is received sequentially according to a schedule of portions characterized by one of the dimensions of the sequence and, for each sequence of elements of the video data stream within a first video field of at least a two-field video frame, the sequence of elements of the video data stream is received in a first dimension, and the sequence of elements of the video data stream is filtered in the first dimension using a programmable scaling filter to provide a first set of scaled data having a first scaled dimension and having at least a second dimension. During a subsequent field time of the video and for each sequence of the first set of scaled data in a second dimension, the first set of scaled data is filtered using the programmable scaling filter to provide a set of two-dimensionally scaled data having at least two dimensions. Advantages include little, if any, support and overhead from a data processor.

14 Claims, 7 Drawing Sheets

FIG.6

TWO PASS MULTI-DIMENSIONAL DATA SCALING ARRANGEMENT AND METHOD THEREOF

FIELD OF THE INVENTION

The present invention is directed to a pixel processing apparatus and method, and more particularly to a pixel processing arrangement and method involving programmable devices to perform vertical and horizontal filtering and/or scaling functions.

BACKGROUND OF THE INVENTION

Large amounts of video information are sometimes processed by characterizing the video information in terms of pixels. A pixel is often used to represent the smallest element of a display surface that can be assigned independent characteristics. Due to the large amount of data required to characterize video information, efficient techniques are required to compress and manage the video information. For example, hierarchical motion searching techniques are often employed when processing and handling large amounts of video information.

Scaling is a common technique used in video processing. For example, a 2:1 scalar may be used to implement a hierarchical motion vector search. Pixel interpolation is another known technique to reduce the amount of data which is processed, stored, transferred, etc. In a pixel interpolator, attributes of a processed pixel are derived by averaging the values of a number of stored pixels. The values may further be weighted depending on the location of the pixels.

One known scaling technique uses a video camera to provide video data to a multi-tap, multiple-phase programmable scaling filter. The video data is transmitted from a source, such as a camera, one pixel at a time with the sequence of pixels being organized into rows, which make up the image. Each row is then provided from the camera left to right and then top to bottom. The programmable scaling filter performs a data filtering operation as well as scales the video data in a horizontal direction as the pixels from the video source pass through the filter, one pixel at a time. The filtered and horizontally scaled image is then stored in memory. The image is next scaled in the vertical direction by a digital signal processing (DSP) device. The DSP device reads the horizontally scaled field image from the memory and executes a vertical scaling routine to provide a horizontally and vertically scaled image for subsequent processing.

For most video processing applications, the DSP may be designed to operate in several different modes and to perform a variety of different tasks. In general, these modes and tasks increase the temporal overhead of the system by increasing the overall processing time. The increased processing time results from the latency associated with the required processing and limits the speed of the video processing systems.

SUMMARY OF THE INVENTION

The present invention is generally directed to a pixel processing arrangement and method in which pixel-related data is scaled first in one direction and then, using the same filtering circuit, scaled in a second direction. The scaling of the received data in the first direction occurs during the first field time of a video frame having at least two fields of data per frame. The processing of the one-dimensionally scaled data in the second direction during the subsequent field time of video frame. Consistent with the present invention, one embodiment involves a circuit arrangement configured to be coupled between a pixel information source and a video processor.

The above summary of the present invention is not intended to describe each illustrated embodiment or every implementation of the present invention. The figures and detailed description which follow more particularly exemplify these embodiments.

BRIEF DESCRIPTION OF THE DRAWINGS

The invention may be more completely understood in consideration of the Detailed Description which follows in connection with the accompanying drawings, in which:

FIG. 4 is an example flow chart of processing performed according to still another embodiment of the present invention;

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF EXAMPLE EMBODIMENTS

The present invention is believed to be applicable to a variety of systems and arrangements which process video information. The invention has been found to be particularly advantageous in application environments, such as video conferencing, where relatively large amounts of video information are processed using techniques that require horizontal and/or vertical scaling of data in the video information. While the present invention is not so limited, appreciation of various aspects of the invention is best gained from discussion of the application examples operating in this type of environment.

Figure 1:
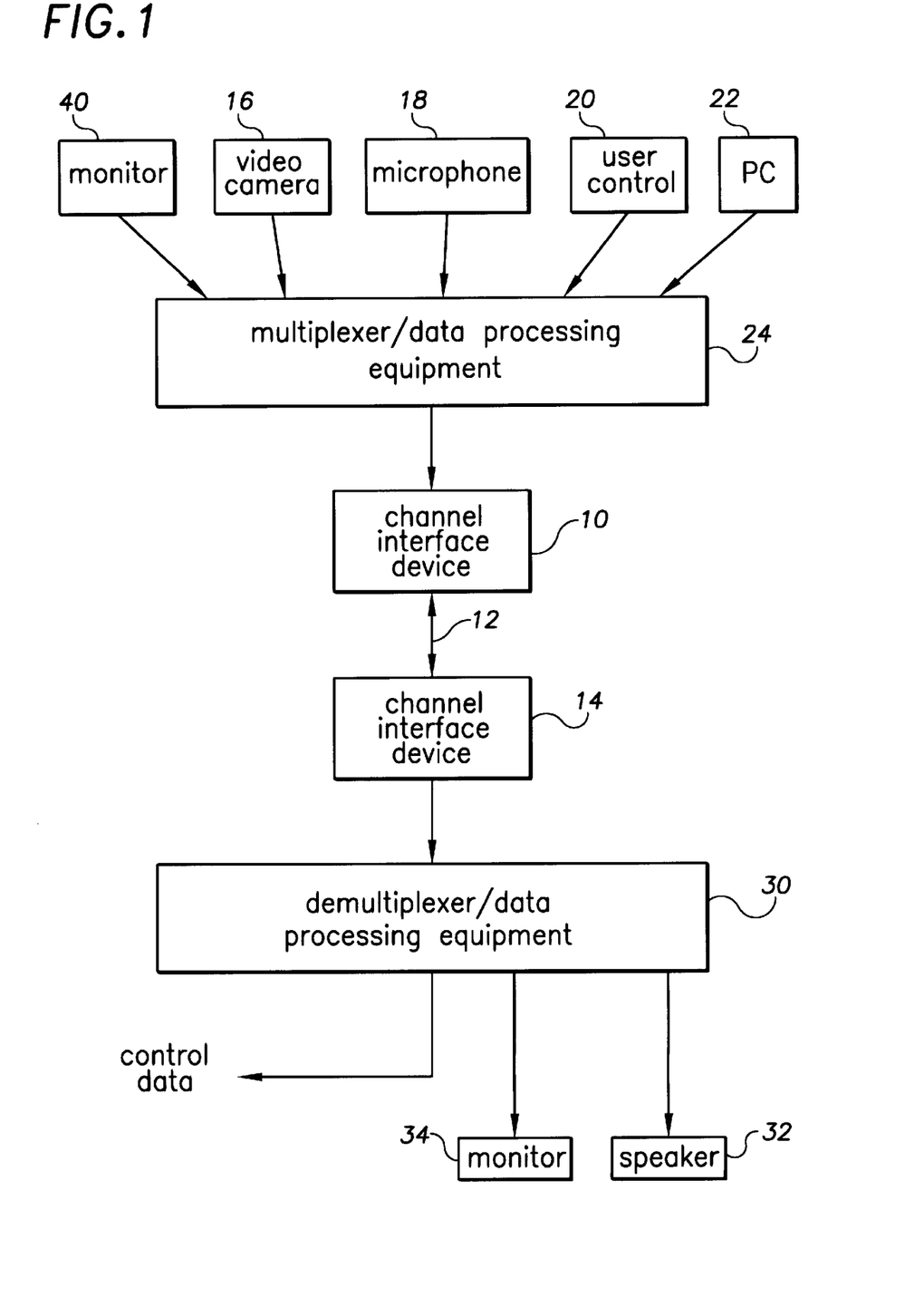
FIG. 1 is a block diagram of a data processing and communication system according to one implementation of the present invention.

FIG. 1 illustrates one particular embodiment, according to the present invention, in which a pixel calculating arrangement that performs horizontal and vertical scaling is employed. In such a digital processing and/or communication system, a variety of input devices are attached to a multiplexer/data processing equipment interface unit 24, which provides the formatting and multiplexing operations needed to connect these various devices through channel interface devices 10 and 14, which are respectively located at different terminals and communicatively coupled to one another through a communication channel 12. The unit 24 presents multiplexed input data to the channel interface device 10 and, after being received over the communication channel 12 and through the channel interface device 14, this multiplexed input data is demultiplexed (or decoded) by processing equipment interface unit 30. In a video conferencing application, the processing equipment interface unit 30 presents the decoded video data from the video camera 16 (via the communication channel 12) to user video conferencing equipment such as speaker 32 and monitor 34. Similarly, at the sending terminal, in addition to the video camera 16, user video conferencing equipment can include a microphone 18 and a monitor 40 as well as control and data input equipment depicted as user control device 20 and PC 22.

The video camera 16 can generate visual image data in a variety of data formats. In many cases, it is advantageous to both filter and scale this input video data from the camera prior to any subsequent display and/or processing of this video data.

This filtering of data received from a video camera is performed within a multiplexer/data processing equipment 24, which is located between the video camera 16 and the channel interface device 10. Data processing equipment which performs this filtering and scaling can either be an integral part of the multiplexer data processing system or a separate input processing device located between the video camera and the multiplexing equipment 24. For purposes of the illustrations contained herein, the arrangement which performs this scaling and filtering process will be described as a separate processing system. However, one skilled in the art can readily integrate this function within the multiplexing and data processing equipment 24 if desirable.

Figure 2:
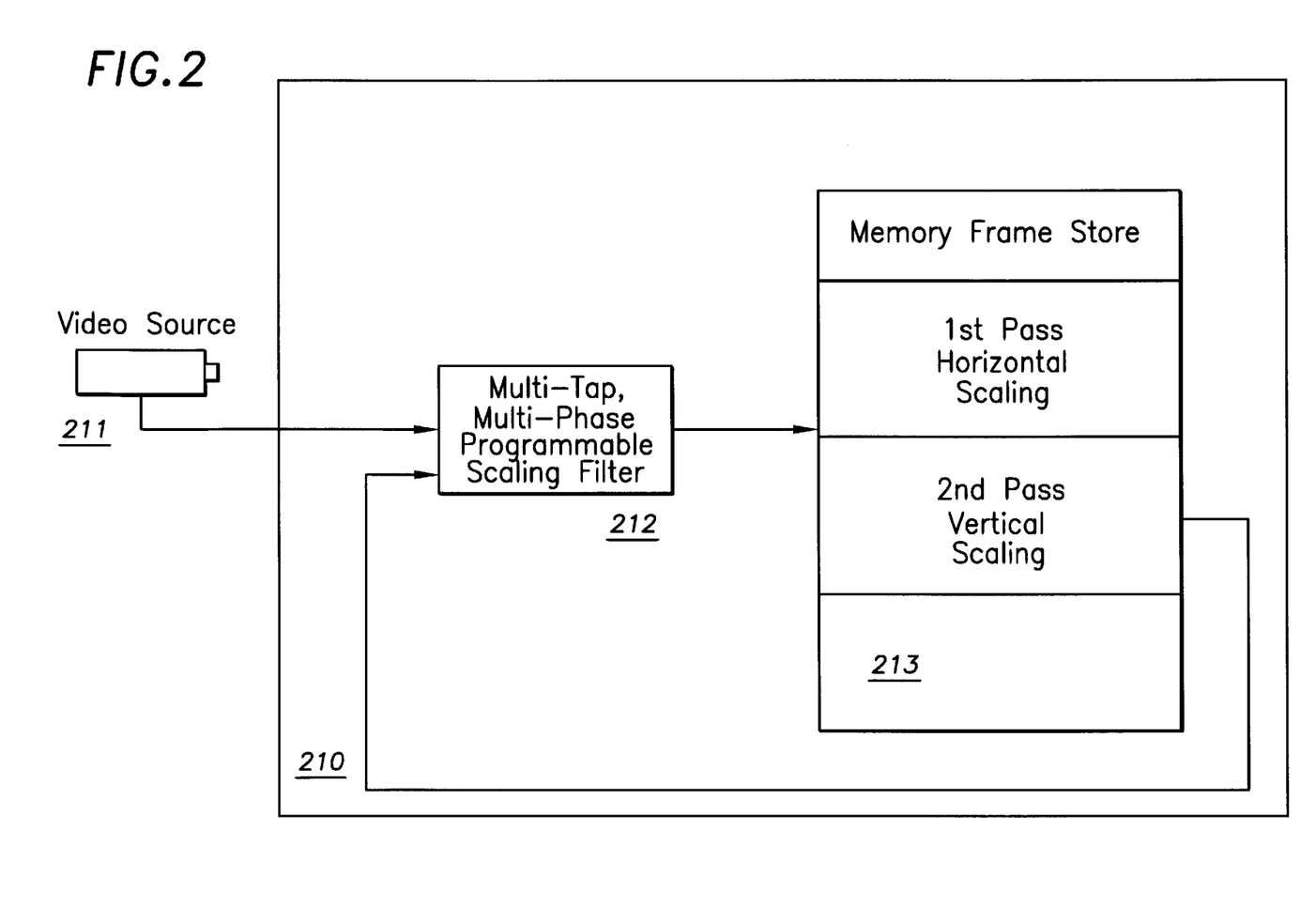
FIG. 2 is a block diagram of an arrangement for performing the scaling operation using a filter apparatus and a memory, according to another embodiment of the present invention.

In FIG. 2, which depicts such a scaling and filtering block 210, the video image data is received from a video source 211, as is done in the previously described conventional system, and it is passed through a multi-phase programmable scaling filter 212, and once again written into the memory frame store 213 from this first pass of processing, as is done in a conventional system. The system then proceeds to read this horizontally scaled video image from the memory frame store and passes it back into an input of the multi-phase programmable scaling filter where the data is read out of the memory frame store in column order, enabling the filtering and scaling to occur in the vertical direction of the image. The multi-phase programmable scaling filter 212 contains an input multiplexer and the necessary control logic to filter and scale the sequences of column pixel data in a manner which may differ slightly from the processing performed on the horizontal, row orientated data, should the vertical processing in the various directions need to differ from the horizontal process. The filter 212 may be implemented using commercially-available digital signal processing components, such as a AD2181 or a TMS320.

Figure 5A:
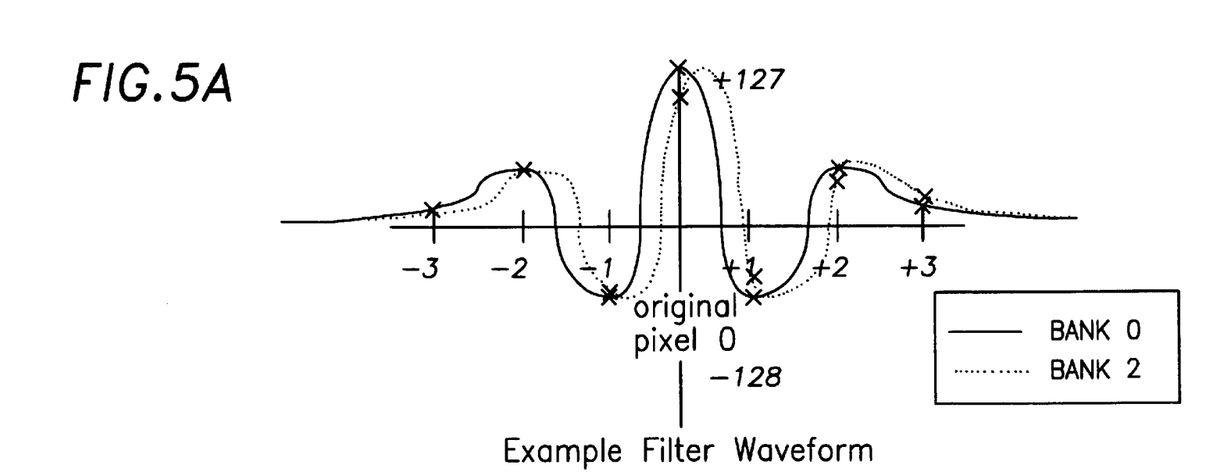
FIG. 5A is an example filter waveform according to an example embodiment of the present invention.

To achieve smooth horizontal scaling, the example embodiment illustrated in FIG. 2 has input and output scaling hardware with 5 banks of 7 taps, totaling 35 taps. The goal of the hardware is to scale with as little aliasing and pixelization as possible. The system can arbitrarily scale on the screen side either up or down in resolution. The scaling hardware creates new pixels as a result of scaling by taking a weighted averaging of the original pixel and its 6 neighboring pixels, in the case of 7-tap filters, or 2 neighboring pixel, in the case of 3-tap filters. An example filtering weighting can be represented roughly as shown in FIG. 5A. The values of the seven taps of the filter must add up to 128 to maintain unity gain, wherein a higher value, used for a luma video example, would result in a brighter image; a lower value for the sum of the filter taps would result in a darker image.

Figure 5B:
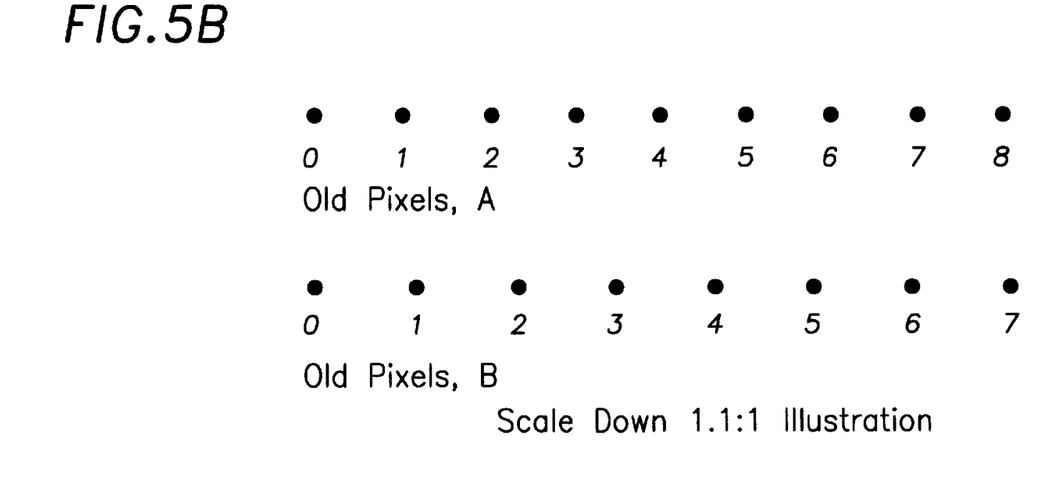
FIG. 5B is a scaled down 1.1:1 illustration of scaling performed according to the present invention.

FIG. 5A illustrates bank 0, where the new pixel is the same location as a pixel from the image before scaling. FIG. 5B illustrates how pixels can land in a location that's not exactly the location of an old pixel. In FIG. 5B, B0=0, B2=1.1, B3=2.2, B4=3.3, B5=4.4, B6=5.5, and B7=6.6 for the scaled pixel locations when stated relative to the old, unscaled pixel locations. When a fractional leftover exists in a scaled location value, the waveform in FIG. 5A changes slightly because its center point of reference is shifted slightly, as shown with the gray line graph. The system has four alternate banks to allow for these pixel variations, and they are chosen as follows:

| Fractional part | Bank selected |
|---|---|
| 0.0 to 0.1 | 0 |
| 0.1 to 0.3 | 1 |
| 0.3 to 0.5 | 2 |
| 0.5 to 0.7 | 3 |
| 0.7 to 0.9 | 4 |
| 0.9 to 1.0 | 0 |

Pixel B4 in the example above would use the coefficient set stored in bank 2.

As the horizontally scaled data is processed back through the programmable scaling filter to create the final scale image, this resultant image is written back into a different block within the memory frame store for later access and subsequent processing by other elements of the communications and data processing system. The system utilizes the fact that standard video data consists of two fields of image data contained within each frame produced at a rate of 30 frames per second. Frequently the video conferencing applications only utilize half of these fields in which the first field contains valid data and the second field contains no encoded data. Thus, the present invention can perform the horizontal filtering and scaling within the scaling filter as the camera is generating valid data during the first field of the frame and then pass the scaled image back through the same hardware during the alternate or invalid field of frame data, thus off loading this additional processing from the DSP processor while adding little or no additional cost in regards to hardware required or processing time needed to complete this function. Alternatively, in a system requiring both fields of data, the vertical processing may occur during the off-screen blanking interval of the video frame.

Figure 3:
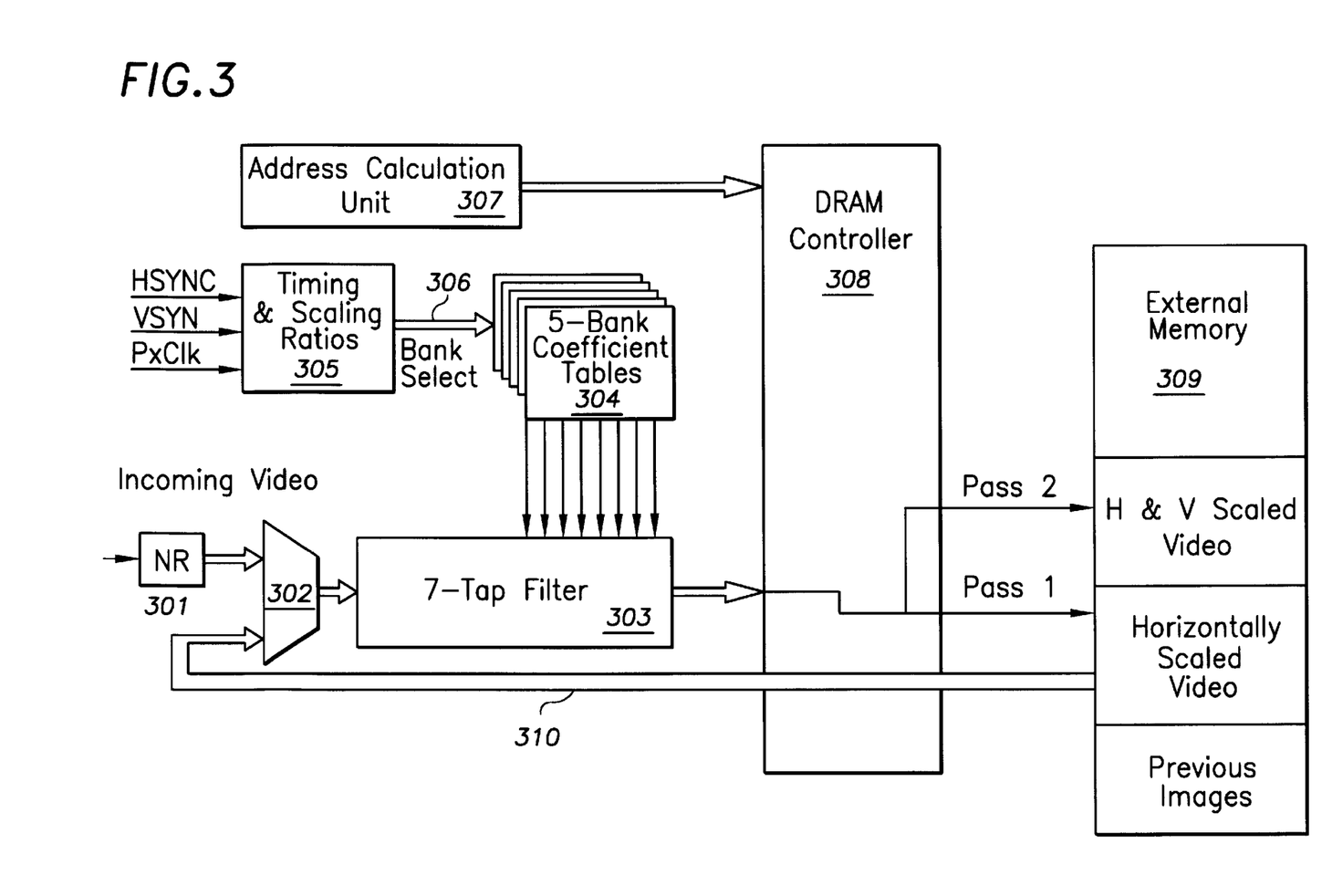
FIG. 3 is a detailed block diagram of an example video processing arrangement, according to an embodiment of the present invention.

FIG. 3 illustrates another arrangement for processing video data, according to an embodiment of the present invention. The incoming video data is received via block labeled NR, 301, which performs a non-linear noise reduction filter. This filter may be implemented as a table lookup and is particularly useful to eliminate analog camera fixed pattern noise before this data passes through a multiplexer 302 and into a seven tap filter 303. This seven-tap filter 303 receives the necessary coefficients to perform the filtering and scaling operation from the five bank coefficient tables item 304 which is controlled by the timing and scaling ratios section 305 using a bank select signal 306. This filter performs a finite impulse response (FIR) low pass interpolation filter. For more information concerning a hardware or software implementation for this type of digital processing circuitry, or specifics concerning the illustrated filter or alternative types of digital filters, reference may be made to "Digital Signal Processing," Emmanuel C. Ifeachor and Barrie W. Jervis, Addison-Wesley, 1993 (e.g. chs. 5 and 6).

The output of the seven tap filter 303 is passed through a DRAM controller 308 before being written into an external memory 309. The DRAM controller 308 utilizes addressing signals from an address calculation unit 307 in order to determine the appropriate address for each pixel within the external memory 309 as the pixels pass through the DRAM controller in row order and then column order. As was described before, during the first pass of processing, the raw incoming data goes through the multiplexer 302 and is processed by the seven-tap filter 303 and is written into the external memory item 309 as horizontally scaled video data. This data is then read back from the external memory 309 utilizing a data bus 310, which is the alternate input into a multiplexer 302 allowing the horizontal scaled data to be input into the seven tap filter 303 and processed in column order during the second pass to create the horizontally and vertically scaled video image.

The timing and scaling ratios control section 305 and the address calculation unit 307 work together to generate the necessary addresses so that the N by M input image which is scaled to N by M' during the first pass as the rows are scaled downwards and then to a N' by M' size during when the vertical columns are scaled during the second pass. This DRAM controller and address calculation unit also performs the necessary address calculations so that the horizontally scaled video image can be written into a block of memory in row order as it is received from the camera but then is read out in column order as it is to be processed during the second pass through the filter. These calculations also depend upon the size of the input image as well as the amount of scaling to be performed which results in the size or number of pixels per row and column that make up the resultant images.

In FIG. 4, a flow chart is provided for the processing which is to be performed by the present invention. The processing begins with block 401 labeled the start of a field. The processing then proceeds to decision block 402 in which a decision is made to capture a field. If the decision is yes, the processing proceeds to block 403 in which a loading of the horizontal scaling values occurs. The processing proceeds to decision block 404.

At decision block 404, the processor decides whether or not noise reduction is to be performed. If it is not, the processing proceeds directly to block 405 in which phase detection occurs. In this phase detection, the scaling process accounts for the fractional shift of pixel values which occurs as a result of the non-integer result of scaling of integer pixel values. This phase detection process controls the selection of the appropriate coefficient bank as discussed above. The processing then proceeds to block 406 in which the banks select of the appropriate coefficient tables occurs. The processing proceeds to block 407 in which a multiply accumulated shift of the coming pixel values occurs perform the filtering and/or scaling. This processing is done within the seven tap filter.

When completed, the processing proceeds to decision block 408 in which a decision is made whether the end of the line of pixels has been reached. If the answer is no, then the processing proceeds to block 409 where the address used to store the output data is incremented by one and processing proceeds back to decision block 404. At this time, the processing continues on through this loop until the end of line occurs wherein the decision block in 408 is answered yes. Each time through the loop, the processing proceeds through blocks 404 through 408 as described above.

When the end of line is reached, the decision block 408 proceeds to the affirmative and the processing proceeds to block 410 in which the phase is reset. The processing then proceeds to block 411 in which the question is asked whether the end of the field has been reached. In essence, this block increments the address pointer for each of the successive rows or lines which are processed in sequence. If the end of the field has not occurred, the processing proceeds to block 412 in which the address is incremented by the line width which corresponds to the number of pixels in the particular line or row. The processing then proceeds to block 409 which increments the address again by one for the next pixel value then the next line is started as seen in blocks 404 through 408 with that loop continuing its processing through for each pixel in the subsequent lines.

Referring again to block 404 where the question is asked whether noise reduction is to be performed, when the answer to this question is yes, the processing proceeds to block 413 in which the previous value of the pixel is retrieved then the processing proceeds to block 414 in which a non-linear lookup table which is a programmable value is then applied to it and the processing. This performs the noise reduction procedure. This procedure removes unwanted signal information resulting form quantization or fixed pattern noise. Processing then proceeds back to block 405 and the processing through the loop of multiply accumulate performs as described above.

The processing proceeds through the loop defined by block 404 through 411 until the end of the field is reached. The end of field is reached when the last line of the field has been completely processed. From block 411, the processing flows through the affirmative branch of the decision and the processing returns back to block 402.

Block 402 is reentered and the decision to capture a field of video is once again cited. As is discussed above, alternate fields are received from the camera and in the second case the capture field would be decided in the negative to allow the processing in vertical direction to occur. The processing goes from blocks 402 through 415 wherein the filter values to be used to perform the vertical scaling values are selected. The processing then falls to block 416 where vertical phase detection is done. The vertical phase detection performs the same type of processing performed in the horizontal direction to align the sampled video image. Processing proceeds to block 417 where banks select is again performed to select the appropriate coefficient table for the filtering and scaling to be performed. Processing proceeds to block 418 where the multiply accumulating shifts process of the filter are performed. This is the same calculation that was performed in the loop of blocks 404 through 408 as the hardware used in performing this process is the same as what was done before. The processing then proceeds to block 419 where the decision is made whether the last column has been processed. If the answer is no, the processing then moves to block 420 where the address is incremented by the line width. This allows the addressing to proceed in a column by column basis and the processing moves back to block 416.

Processing then continues through the loop defined by blocks 416 through 419 until the last line is in fact processed at which time the decision in block 419 is the affirmative and the processing proceeds to block 421. In this block, the vertical phase is reset as it was resent in the horizontal direction. The processing then proceeds to decision block 422.

If the answer to this test is whether the last column in fact has been processed is no, the loop needs to continue until all of the columns have been processed and the processing proceeds to block 423. In this block the address is set to the row count times the line width. Thus the address can step through the block of video image data column by column and the processing proceeds back to the beginning of the loop defined at block 416.

Processing then proceeds through the next column until all of the columns defined by the loops have been processed at which time the decision block in 422 is answered in the affirmative as the last column is processed. The affirmative decision block then proceeds to block 402 in which a new field of video image data is to be captured and then processed.

Figure 6:
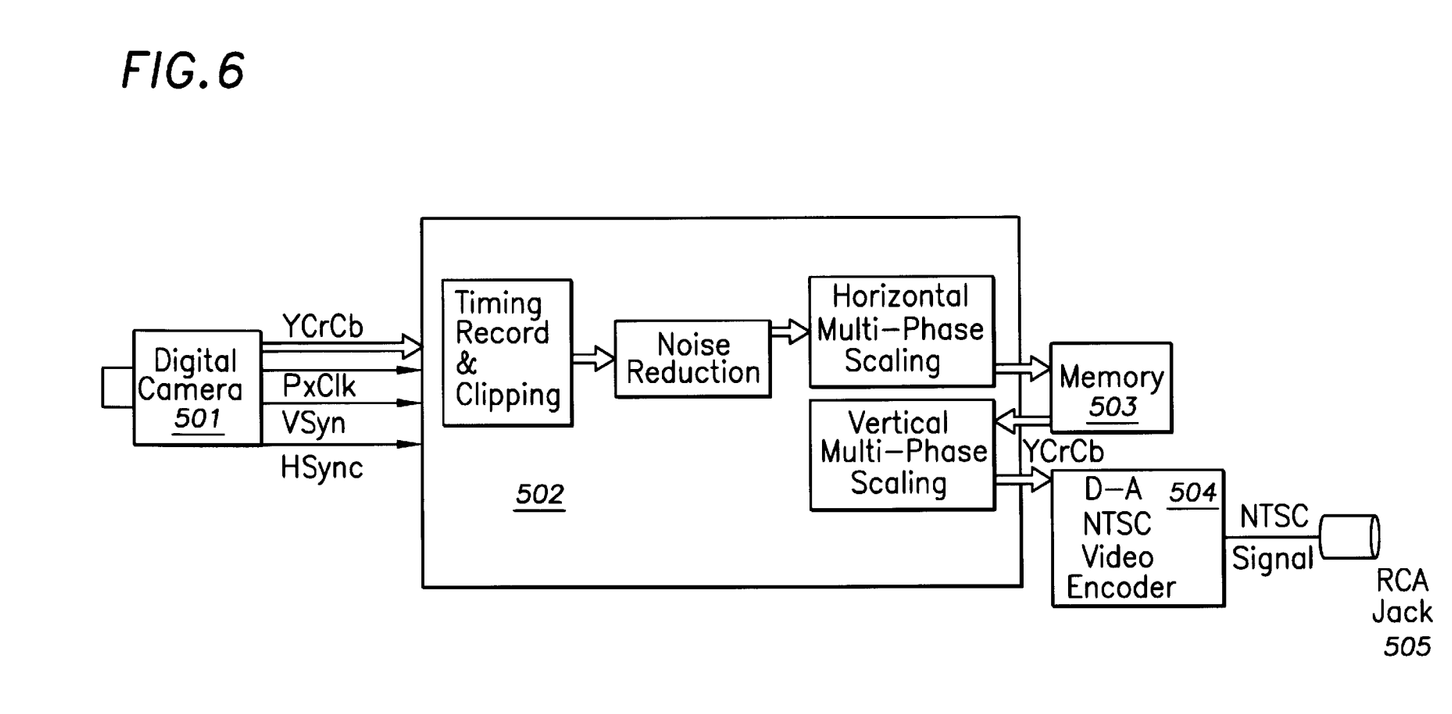
FIG. 6 illustrates in block diagram form an example video processing arrangement according to another embodiment of the present invention.

In FIG. 6, one possible embodiment and use of the present invention is disclosed. As is described previously, the digital video image received from digital camera of block 501 is passed to a programmable digital signal processor, which performs tasks associated with the present invention, block 502. As is described previously, the data there possibly has noise reduction applied and then horizontal scaling is performed in a pixel by pixel basis as the data is written into memory block 503. Data then read back out of the memory vertical scaling is performed in which the horizontally and vertically pixels are then able to be output from the system. This data as it is being processed can be sent to an external video encoder 504 to generate a video signal, which is sent to a jack 505 for possible display or use elsewhere within the system.

Additionally, by excising a smaller portion of the available image and using the scaling function of the present invention to create a standard CCIR 601 output, an entirely digital electronic pan, tilt, and zoom NTSC camera may be implemented. The entire processing of the present invention as previously described is performed within the block identified as 502. This processing can occur in real time as the data passes directly from the camera to the video jack.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for producing a scaled and filtered, multi-dimensional digital image from an incoming video data stream, wherein the video data is received in a sequence according to a schedule of portions characterized by one of the dimensions of the sequence, comprising the steps of:

for each sequence of elements of the video data stream within a first video field of at least a two-field video frame, processing the video data within a first field time by
receiving the sequence of elements of the video data stream in a first dimension; and
filtering the sequence of elements of the video data stream in the first dimension using a programmable scaling filter to provide a first set of scaled data having a first scaled dimension and having at least a second dimension; and
during a subsequent field time of the video data and for each sequence of the first set of scaled data in a second dimension, filtering the first set of scaled data using the programmable scaling filter to provide a set of two-dimensionally scaled data having at least two dimensions.

2. A method according to claim 1, wherein the processing performed during the first field time further comprises the step of storing the first set of scaled data in a memory.

3. A method according to claim 2, wherein the receiving step further comprises the steps of:

receiving the sequence of elements of the video data stream; and
selecting one or more pixel data values from the sequence of elements of the video data stream to create a sequence of elements of the video data stream used in subsequent processing.

4. A method according to claim 3, wherein the selecting step is controlled by a user to create digital pan, tilt, or zoom functions.

5. A method for producing a scaled and filtered, two-dimensional digital image from an incoming video data stream, wherein the video data is received sequentially according to a row and a column order, comprising of the steps of:

for each row of the video data stream within a first video field of at least two-field video frame processing the video data within a first field time by,
receiving the row of the video data stream;
selecting one or more pixel data values from the row of video data stream; and
filtering the selected pixel data values using a programmable scaling filter to provide a first set of scaled data having a first scaled dimension and having at least a second dimension;
during a subsequent field time of the video data and for each column of the first set of scaled data, filtering the first set of scaled data using the programmable scaling filter to provide a second set of scaled data having at least two dimensions.

6. A method according to claim 5, wherein the processing performed during the first field time further comprising the step of storing the first set of scaled data in a memory.

7. A method for producing a scaled and filtered, two-dimensional digital image from an incoming video data stream, wherein the video data is received sequentially one row at a time comprising of the steps of:

during the first field time of a two field video frame perform the method comprising the steps of:
(1) receiving a line of video image data, one pixel at a time,
(2) processing the line of digital video imaging data through a multi-tap, five bank multiphase programmable scaling filter and generating therefrom horizontally scaled data,
(3) writing the horizontally scaled data into a memory frame store,
(4) repeat steps (1)–(3) for each line of video data within the first video field; and
during the second field time of the video frame, perform the method comprising the steps of:
(5) retrieving a vertical column of horizontally scaled digital image data from the memory frame store, one pixel at a time,
(6) processing the vertical column of horizontally scaled, digital image data through the multi-tap, five bank, multiphase programmable scaling filter and generating therefrom vertically scaled data,
(7) writing the vertically and horizontally scaled digital video image data into the memory frame store; and
(8) repeating steps (5–7) above for each column in the horizontally scaled video image.

8. A method for producing a scaled and filtered, two dimensional digital video image from an incoming digital video data stream, wherein the video data consists of two fields of data within each video frame and where the video data is received sequentially one row of pixels at a time, comprising the steps of:

during the first field time of the video frame,
(1) enabling a multiplexer at an input to a multi-tap, five bank, multiphase programmable filter to select input from an external incoming video data source,
(2) selecting one of five banks of coefficient tables used by the programmable filter,
(3) initializing a DRAM controller with a starting address for a block of memory where a horizontally scaled, digital video image will be stored;
(4) passing a row of pixel values from the output of the multiplexer through the programmable filter, one pixel at time,
(5) for each passed pixel in the row, calculating a horizontally scaled, digital video data pixel value with the programmable filter one pixel at a time, and thereby generating a row of horizontally scaled video pixel values;
(6) writing the row of the horizontally scaled video pixel values into the block of memory addressed by the DRAM controller, and
(7) repeat steps (4)–(6) for each row of digital video data received from the external source; and during the second field time of the video frame,
(8) selecting one of the five banks of coefficient tables used by the programmable filter,
(9) initializing the DRAM controller with the starting address for the block of memory corresponding to a first pixel value within the horizontally scaled digital video image,
(10) setting the DRAM controller to address the block of memory to sequentially address the horizontally scaled digital video image data in column order,
(11) passing a column of horizontally scaled pixel values from the memory and through the multiplexer to the programmable filter,
(12) calculating the column of vertically scaled digital video data pixel values within the programmable filter, one pixel at a time,
(13) writing the scaled digital video pixel values into a second block of the memory as addressed by the DRAM controller, and
(14) repeating steps (11–13) for each column in the horizontally scaled video data image.

9. The method of claim 8, wherein the programmable filter is a seven-tap programmable filter.

10. An arrangement for producing a scaled and filtered, multi-dimensional digital image from an incoming video data stream, wherein the video data is received in a sequence according to a schedule of portions characterized by one of the dimensions of the sequence, the arrangement comprising: a programmable data processor circuit configured and arranged to execute the following operations for each sequence of elements of the video data stream within a first video field of at least a two-field video frame, processing the video data within a first field time by
receiving the sequence of elements of the video data stream in a first dimension; and
filtering the sequence of elements of the video data stream in the first dimension using a programmable scaling filter to provide a first set of scaled data having a first scaled dimension and having at least a second dimension; and during a subsequent field time of the video data and for each sequence of the first set of scaled data in a second dimension, filtering the first set of scaled data using the programmable scaling filter to provide a set of two-dimensionally scaled data having at least two dimensions.

11. The arrangement of claim 10, wherein the processing performed during the first field time further comprises storing the first set of scaled data in a memory.

12. The arrangement of claim 11, wherein the receiving operation further comprises:
receiving the sequence of elements of the video data stream; and
selecting one or more pixel data values from the sequence of elements of the video data stream to create a sequence of elements of the video data stream used in subsequent processing.

13. An arrangement for producing a scaled and filtered, two-dimensional digital image from an incoming video data stream, wherein the video data is received sequentially according to a row and a column order, comprising: a programmable data processor circuit configured and arranged to execute the following operations for each row of the video data stream within a first video field of at least two-field video frame:
receiving the row of the video data stream;
selecting one or more pixel data values from the row of video data stream; and
filtering the selected pixel data values using a programmable scaling filter to provide a first set of scaled data having a first scaled dimension and having at least a second dimension;

during a subsequent field time of the video data and for each column of the first set of scaled data, filtering the first set of scaled data using the programmable scaling filter to provide a second set of scaled data having at least two dimensions.

14. An arrangement for producing a scaled and filtered, multi-dimensional digital image from an incoming video data stream, wherein the video data is received in a sequence according to a schedule of portions characterized by one of the dimensions of the sequence, the arrangement comprising:

for each sequence of elements of the video data stream within a first video field of at least a two-field video frame, processing means for processing the video data within a first field time by
receiving the sequence of elements of the video data stream in a first dimension; and
filtering the sequence of elements of the video data stream in the first dimension using a programmable scaling filter to provide a first set of scaled data having a first scaled dimension and having at least a second dimension; and filtering means for filtering, during a subsequent field time of the video data and for each sequence of the first set of scaled data in a second dimension, the first set of scaled data using the programmable scaling filter to provide a set of two-dimensionally scaled data having at least two dimensions.

* * * * *